United States Patent [19]

Jacobs et al.

[11] Patent Number: 5,639,401
[45] Date of Patent: Jun. 17, 1997

[54] PROCESS FOR THE CATALYTIC PARTIAL OXIDATION OF HYDROCARBONS

[75] Inventors: Ludovicus Leonardus Gerardus Jacobs; Peter William Lednor; Petrus Josephus Maria Van Loon; Marten Oosterveld; Koert Alexander Vonkeman, all of Amsterdam, Netherlands

[73] Assignee: Shell Oil Company, Houston, Tex.

[21] Appl. No.: 557,782

[22] Filed: Nov. 13, 1995

[51] Int. Cl.$^6$ ............................... C07C 1/02; B01J 23/00
[52] U.S. Cl. ..................... 252/373; 502/100; 502/349
[58] Field of Search ................................ 252/373, 374

[56] References Cited

U.S. PATENT DOCUMENTS 5,149,464  9/1992  Green .

FOREIGN PATENT DOCUMENTS

| 548679 | 6/1993 | European Pat. Off. . |
| 576 096 A2 | 6/1993 | European Pat. Off. . |
| 576096 | 12/1993 | European Pat. Off. . |
| 1283780 | 8/1972 | United Kingdom . |

OTHER PUBLICATIONS

B. Maxwell, B. Powell, "Proceedings of the 9th Automotive Materials Conf.", 13 Nov. 1980, The Amer. Chem. Soc., Columbus, OH, pp. 337–351, see especially p. 340.

PCT Search Report (Oct. 26, 1995).

*Primary Examiner*—Gary Geist
*Assistant Examiner*—Karl Puttlitz
*Attorney, Agent, or Firm*—Kim Muller

[57] ABSTRACT

The present invention relates to a process for the catalytic partial oxidation of a hydrocarbon feedstock comprising contacting a feed comprising a hydrocarbon feedstock and an oxygen-containing gas with a catalyst at an elevated temperature under conditions such the catalyst will be susceptible to a thermal shock, the catalyst having the form of a porous monolithic structure and comprising a catalytically active metal supported on a zirconia-based carrier.

14 Claims, No Drawings

PROCESS FOR THE CATALYTIC PARTIAL OXIDATION OF HYDROCARBONS

FIELD OF THE INVENTION

The present invention relates to a process for the catalytic partial oxidation of hydrocarbons, in particular to a process for the preparation of a mixture of carbon monoxide and hydrogen from methane, natural gas, associated gas or other sources of light hydrocarbons.

BACKGROUND OF THE INVENTION

The partial oxidation of hydrocarbons, for example methane or natural gas, in the presence of a catalyst is an attractive process for the preparation of mixtures of carbon monoxide and hydrogen, known in the art as synthesis gas. The partial oxidation of a hydrocarbon is a highly exothermic reaction and, in the case in which methane is the hydrocarbon, proceeds by the reaction:

$$2CH_4 + O_2 \rightarrow 2CO + 4H_2$$

A number of process regimes have been proposed in the art for carrying out the catalytic partial oxidation reactions. One regime that is most suitable for application on a commercial scale is to contact the feed gases with the catalyst retained in a fixed arrangement. The literature contains a number of documents disclosing details of experiments conducted into the catalytic partial oxidation of hydrocarbons, in particular methane, employing a wide range of catalysts in a fixed bed arrangement.

A number of academic experiments have been reported in the literature in which catalysts have been employed in the form of fixed beds of catalyst particles.

Thus, A. T Ashcroft et al. ("Selective oxidation of methane to synthesis gas using transition metal catalysts", Nature, Vol. 344, No. 6264, pages 319 to 321, 22nd March, 1990) disclose the partial oxidation of methane to synthesis gas in the presence of a range of ruthenium-containing catalysts. The objective of the experiments was to establish that the partial oxidation process could be carried out under mild conditions and at low temperatures. To this end, the experiments were conducted with a low gas hourly space velocity of 40,000/hr, a pressure of 1 atmosphere and a temperature of about 775° C. The catalyst employed comprised small amounts of a solid, powdered catalyst.

P. D. F. Vernon et al. ("Partial Oxidation of methane to Synthesis Gas", Catalysis Letters 6 (1990) 181–186) disclose a range of experiments in which catalysts comprising nickel, ruthenium, rhodium, palladium, iridium or platinum, either supported on alumina or present in mixed oxide precursors, were applied. Again, the experiments reported are limited to a catalytic partial oxidation process employing only mild operating conditions and using small amounts of catalyst in the form of pellets retained in a fixed bed. The authors report the same experiments in "Partial Oxidation of Methane to Synthesis Gas, and Carbon Dioxide as an Oxidizing Agent for Methane Conversion", Catalysis Today, 13 (1992) 417–426.

R. H. Jones et al. ("Catalytic Conversion of Methane to Synthesis Gas over Europium Iridate, Eu2Ir2O7", Catalysis Letters 8 (1991) 169–174) report the selective partial oxidation of methane using the europium iridium pyrochlore Eu2Ir2O7. The reaction was studied under the mild conditions of a pressure of 1 atmosphere and a temperature of 873 K (600° C.). The catalyst was prepared by grinding and subsequent pressing to form pellets. The pelletized catalyst was packed into a porous silica frit and used directly in the experiments.

U.S. Pat. No. 5,149,464 is directed to a method for selectively oxygenating methane to carbon monoxide and hydrogen by bringing the reactant gas mixture at a temperature of about 650° C. to 900° C. into contact with a solid catalyst which is generally described as being either:

a) a catalyst of the formula MxM'yOz, where:

M is at least one element selected from Mg, B, Al, Ln, Ga, Si, Ti, Zr and Hf; Ln is at least one member of lanthanum and the lanthanide series of elements;

M' is a d-block transition metal, and each of the ratios x/y and y/z and (x+y)/z is independently from 0.1 to 8; or b) an oxide of a d-block transition metal; or c) a d-block transition metal on a refractory support; or d) a catalyst formed by heating a) or b) under the conditions of the reaction or under non-oxidizing conditions.

The d-block transition metals are said in U.S. Pat. No. 5,149,464 to be selected from those having atomic number 21 to 29, 40 to 47 and 72 to 79, the metals scandium, titanium, vanadium, chromium, manganese, iron, cobalt, nickel, copper, zirconium, niobium, molybdenum, technetium, ruthenium, rhodium, palladium, silver, hafnium, tantalum, tungsten, rhenium, osmium, iridium, platinum and gold. It is stated in U.S. Pat. No. 5,149,464 that the preferred metals are those in Group VIII of the Periodic Table of the Elements, that is iron, osmium, cobalt, rhenium, iridium, palladium platinum, nickel and ruthenium.

The process described in U.S. Pat. No. 5,149,464 is operated at a temperature in the range of from 650° C. to 900° C., with a range of from 700° C. to 800° C. being preferred. A range of experiments are described in U.S. Pat. No. 5,149,464 in which a variety of catalysts comprising Group VIII metals were tested, including ruthenium oxide, praesidium/ruthenium oxides, pyrochlores, ruthenium on alumina, rhodium on alumina, palladium on alumina, platinum on alumina, nickel/aluminium oxide, perovskites and nickel oxide.

A similar general disclosure of a catalyst for use in the catalytic partial oxidation process is made in International Patent Application publication No. WO 92/11199. WO 92/11199 specifically discloses experiments in which catalysts comprising iridium, palladium, ruthenium, rhodium, nickel and platinum supported on alumina were applied. All the experiments were conducted under mild process conditions, with typical conditions being a pressure of 1 atmosphere, a temperature of 1050K (777° C.) and a gas hourly space velocity of about 20,000/hr.

The experiments described in both U.S. Pat. No. 5,149,464 and WO 92/11199 employed catalysts in the form of solid powdered particles retained in a fixed bed arrangement by packing in a reaction tube between two plugs of silica wool.

European Patent Application Publication No. 303,438 (EPA 303,438) discloses a process for the catalytic partial oxidation of a hydrocarbonaceous feedstock in which a gaseous mixture of the hydrocarbonaceous feedstock, oxygen or an oxygen-containing gas and, optionally, steam, is introduced into a catalytic partial oxidation zone to contact a catalyst retained therein. The catalyst employed in the process may comprise a wide range of catalytically active components, for example palladium, platinum, rhodium, iridium, osmium, ruthenium, nickel, chromium, cobalt, cerium, lanthanum and mixtures thereof. Further, it is stated in EPA 303,438 that materials not normally considered to be catalytically active may also be employed as catalysts, for example refractory oxides such as cordierite, mullite, mullite aluminium titanate, zirconia spinels and alumina. The catalyst may be of a variety of forms, for example sheets of corrugated metal packed to form elongate channels therethrough or wire mesh. However, preference is given in EPA 303,438 to the use of catalysts in the form of extruded honeycomb monoliths. These monoliths comprise a large number of parallel channels extending through the structure in the direction of flow of the feed and product gasses.

European Patent No. 262,947 (EPB 262,947) discloses a process for generating hydrogen by the partial oxidation of a hydrocarbon in which a mixture of the hydrocarbon and oxygen is injected into a mass of a catalyst. The catalyst disclosed in EPB 262,947 comprises platinum and chromium oxide supported on a refractory solid. The support structures described in EPB 262,947 are monolithic honeycomb supports, of the type used in purifying the exhausts from motor vehicles or from chemical plants, and particulate supports, preferably comprising particles having a maximum dimension of from 1 to 4 mm, for example 1.5 mm.

D. A. Hickman and L. D. Schmidt ("Synthesis Gas Formation by Direct Oxidation of Methane over Pt Monoliths", Journal of Catalysis 138, 267–282, 1992)) have conducted experiments into the partial oxidation of methane in the presence of catalysts comprising either platinum or rhodium. The partial oxidation reactions were conducted at substantially atmospheric pressure and at temperatures in the range of from 600 to 1500K (327° to 1227° C.). The catalysts employed were in the form of metal gauzes, metal-coated foam monoliths and metal coated extruded monoliths. The metal gauze catalysts comprised 1 to 10 layers of gauzes of either 40 mesh (40 wires per inch) or 80 mesh. The foam monoliths were of alpha-alumina and described as having an open cellular, sponge-like structure. The samples employed had a nominal porosity of 30 to 50 pores per inch (ppi). The extruded monoliths were cordierite extruded monoliths, having 400 square cells/in$^2$ and consisted of straight parallel channels giving laminar flows of gases through the channels under the conditions of gas flowrate studied.

J. K. Hockmuth ("Catalytic Partial Oxidation of Methane over a monolith Supported Catalyst", Applied Catalysis B: Environmental, 1 (1992) 89–100) reports the catalytic partial oxidation of methane using a catalyst comprising a combination of platinum and palladium supported on a cordierite monolith body.

European Patent Application Publication No. 576,096 (EPA 576,096) discloses a process for the catalytic partial oxidation of a hydrocarbon feedstock in which a feed comprising a hydrocarbon feedstock, an oxygen-containing gas and, optionally, steam at an oxygen-to-carbon molar ratio in the range of from 0.45 to 0.75 is contacted with a catalyst in a reaction zone under adiabatic conditions. The catalyst comprises a metal from Group VIII of the Periodic Table of the Elements supported on a carrier and is retained in the reaction zone in a fixed arrangement having a high tortuosity. A wide range of carrier materials and structures are disclosed in EPA 576,096, including particles of carrier material, metal gauzes and ceramic foams. Suitable materials for use as carrier materials are said to include the refractory oxides such as silica, alumina, titania, zirconia and mixtures thereof. Alumina is stated as being an especially preferred carrier material.

European Patent Application Publication No. 548,679 (EPA 548,679) discloses a process for the preparation of carbon monoxide and hydrogen by the catalytic partial oxidation of methane in the presence of a catalyst prepared by depositing, as an active component, rhodium and/or ruthenium on a carrier comprising zirconia or stabilized zirconia. The catalyst is described in EPA 548,679 as being of any suitable form, such as finely divided powder, beads, pellets, plates, membranes or monoliths. The catalytic partial oxidation process is described in EPA 548,679 as being conducted at a temperature of from 350° to 1200° C., preferably from 450° to 900° C. under a pressure of up to 300 kg/cm$^2$G, preferably lower than 50 kg/cm$^2$G. Typical operating gas space velocities are described in EPA 548,679 as being in the range of from 1,000 to 40,000 h$^{-1}$, preferably from 2,000 to 20,000 h$^{-1}$. The specific examples of EPA 548,679 describe experiments conducted at atmospheric pressure at temperatures of from 300° to 750° C. and space velocities of 16,000 and 43,000 h$^{-1}$. In all the experiments described in EPA 548,679, the catalyst was retained in the form of a fixed bed of particles.

The specification of European Patent Application No. 93203331.9 (as yet unpublished) contains a description of a process for the catalytic partial oxidation of a hydrocarbon feedstock in which the hydrocarbon is mixed with an oxygen-containing gas and contacted with a catalyst. The catalyst is retained in a fixed arrangement having a high tortuosity of at least 1.1 and at least 750 pores per square centimeter. The catalyst preferably comprises a catalytically active metal supported on a carrier. Suitable carrier materials are described as including the refractory oxides, such as silica, alumina, titania, zirconia and mixtures thereof. A catalyst comprising a zirconia ceramic foam as carrier is specifically exemplified.

An attractive catalytic partial oxidation process for application on a commercial scale would operate at elevated pressures, typically in excess of 10 bar, for example at around 30 bar, and at high gas hourly space velocities, typically of the order of 500,000 to 1,000,000 h$^{-1}$. Due to the thermodynamic behavior of the partial oxidation reaction, in order to obtain a high yield of carbon monoxide and hydrogen at elevated pressures, it is necessary to operate the reaction at elevated temperatures. Temperatures on the order of 1000° C. or higher are necessary for obtaining the yields demanded of a commercial process.

It has been found that a most suitable fixed arrangement for the catalyst for use in the catalytic partial oxidation of hydrocarbons under conditions which would be commercially attractive is one in which the catalyst is retained in the form of a monolithic structure. Catalysts for use in such a process comprise one or more catalytically active components supported on a refractory oxide carrier, the carrier being in the form of a monolith. As mentioned hereinbefore, the partial oxidation reactions are very exothermic, with typical reaction conditions in excess of 1000° C. being required for successful commercial scale operation. However, it has now been found that major problems can arise in the operation of the partial oxidation process when using a catalyst in the form of a monolith. In particular, it has been found that the refractory monolithic catalyst structures are very susceptible to thermal shock under the conditions of very high temperature prevailing in the catalytic partial oxidation process. Thermal shocks arise when the catalyst is subjected to a rapid change in temperature, giving rise to substantial temperature gradients across the catalyst structure. Thermal shocks may arise during a shut-down of a commercial reactor in the case of an emergency, in which case it will be necessary to rapidly cool the reactor and its contents. Thermal shocks may also be encountered by the catalyst during start-up procedures and during normal process operation when fluctuations in the feed rate and composition occur.

The measures needed to prevent the catalyst being subjected to thermal shocks during the operation of a process on a commercial scale are very expensive. Accordingly, there is a need for a catalytic partial oxidation process which combines a high level of selectivity to carbon monoxide and hydrogen, a high level of catalyst stability and resistance to thermal shocks.

Surprisingly, it has now been found that zirconia-based monolith structures offer a significantly greater resistance to thermal shocks under the operating conditions of the catalytic partial oxidation process than monoliths prepared from other materials.

SUMMARY OF THE INVENTION

Accordingly, the present invention provides a process for the catalytic partial oxidation of a hydrocarbon feedstock, which process comprises contacting a feed comprising a hydrocarbon feedstock and an oxygen-containing gas with a catalyst at elevated temperature under conditions such the catalyst will be susceptible to a thermal shock, the catalyst being in the form of a porous monolithic structure and comprising a catalytically active metal supported on a zirconia-based carrier.

DETAILED DESCRIPTION OF THE INVENTION

The process provided by the present invention is particularly advantageous in that the specific catalyst employed has been found to be particularly robust under the extreme conditions prevailing in the presence of the catalytic partial oxidation reactions. In particular, the process has been found to be robust in circumstances in which the catalyst is subjected to thermal shocks. It has been found that the zirconia-based monolithic catalysts exhibit a markedly superior resistance to thermal shock under partial oxidation conditions than conventional catalysts, such as those based on alumina. For the purposes of this specification, the term "thermal shock" is a reference to conditions under which the catalyst experiences rapid changes in temperature over a wide temperature range. In particular, the term "thermal shock" is a reference to conditions under which the temperature experienced by the catalyst will change at a rate of at least 1° C. per second over a temperature range of at least 100° C. The process of this invention may be applied under conditions such that the thermal shock is at least 10° C. per second over a range of 100° C. Conditions may be applied giving rise to greater thermal shocks, for example at least 50° C. per second over a range of 500° C. The process may be operated with conditions of still greater thermal shock, for example at least 100° C. per second over a range of 500° C., being experienced by the catalyst.

The process of the present invention may be used to prepare a mixture of carbon monoxide and hydrogen from any hydrocarbon or hydrocarbon feedstock. The hydrocarbon is in the gaseous phase when contacting the catalyst. The process is particularly suitable for the partial oxidation of methane, natural gas, associated gas or other sources of light hydrocarbons. In this respect, the term "light hydrocarbons" is a reference to hydrocarbons having from 1 to 5 carbon atoms. The process may be advantageously applied in the conversion of gas from naturally occurring reserves of methane which contain substantial amounts of carbon dioxide. The feed preferably comprises methane in an amount of at least 50% by volume, more preferably at least 70% by volume, especially at least 80% by volume.

The hydrocarbon feedstock is contacted with the catalyst as a mixture with an oxygen-containing gas. Air is suitable for use as the oxygen-containing gas. However, the use of substantially pure oxygen as the oxygen-containing gas may be preferred. In this way, the need for handling a large volume of inert gas, for example nitrogen when using air as the oxygen-containing gas, is avoided. The feed may optionally comprise steam.

The hydrocarbon feedstock and the oxygen-containing gas are preferably present in the feed in such amounts as to give an oxygen-to-carbon ratio in the range of from 0.3 to 0.8, more preferably, in the range of from 0.45 to 0.75. References herein to the oxygen-to-carbon ratio refer to the ratio of oxygen in the from of molecules ($O_2$) to carbon atoms present in the hydrocarbon feedstock. Preferably, the oxygen-to-carbon ratio is in the range of from 0.45 to 0.65, with oxygen-to-carbon ratios in the region of the stoichiometric ratio of 0.5, that is ratios in the range of from 0.45 to 0.65, being especially preferred. If steam is present in the feed, the steam-to-carbon ratio is preferably in the range of from above 0.0 to 3.0, more preferably from 0.0 to 2.0. The hydrocarbon feedstock, the oxygen-containing gas and steam, if present, are preferably well mixed prior to being contacted with the catalyst.

The process of the present invention may be operated at any suitable pressure. For applications on a commercial scale, elevated pressures, that is pressures significantly above atmospheric pressure are most suitably applied. The process may be operated at pressures in the range of up to 150 bara. Preferably, the process is operated at pressures in the range of from 2 to 125 bara, especially from 5 to 100 bara.

The process may be operated at any suitable temperature. Under the preferred conditions of high pressure prevailing in processes operated on a commercial scale, the feed is preferably contacted with the catalyst at high temperatures. This is necessary if high levels of conversion are to be achieved at the preferred elevated pressures. Accordingly, the feed mixture is preferably contacted with the catalyst at a temperature in excess of 950° C., more preferably at a temperature in the range of from 950° to 1400° C., especially from 1000° to 1300° C. The feed mixture is preferably preheated prior to contacting the catalyst.

The feed may be provided during the operation of the process at any suitable space velocity. It is an advantage of the process of the present invention that very high gas space velocities can be achieved. Thus, gas space velocities for the process (expressed in normal liters of gas per kilogram of catalyst per hour) are in the range of from 20,000 to 100,000,000 Nl/kg/hr, more preferably in the range of from 5,000 to 50,000,000 Nl/kg/hr. Space velocities in the range of from 500,000 to 30,000,000 Nl/kg/hr are particularly suitable for use in the process.

The catalyst employed in the process of the present invention comprises a catalytically active metal supported on a monolithic zirconia-based structure. Catalytically active metals for inclusion in the catalyst are selected from Group VIII of the Periodic Table of the Elements. References herein to the Periodic Table are to the CAS version, as published in the CRC Handbook of Chemistry and Physics, 68th Edition. Preferred catalysts for use in the process of the present invention comprise a metal selected from ruthenium, rhodium, palladium, osmium, iridium and platinum. Catalysts comprising ruthenium, rhodium or iridium as the catalytically active metal are particularly preferred. Iridium is a most suitable catalytically active metal.

The catalyst comprises the catalytically active metal supported on a zirconia-based carrier. Any suitable zirconia-based material may be employed. Suitable zirconia materials are available commercially. The carrier preferably comprises at least 90% by weight zirconia. Stabilized zirconia or substantially pure zirconia are particularly preferred zirconia-based materials.

The carrier is in the form of a porous monolithic structure. The monolithic structure may comprise one or a plurality of individual monolithic portions of carrier. The porous monolithic structure may have any suitable form. One form of monolithic structure is that of an extruded honeycomb, suitable materials of which are known in the art and available commercially. The extruded honeycomb material are characterized by having a plurality of straight, elongate, parallel channels extending through the structure. However, preferred monolithic structures are those having a high tortuosity. The term "tortuosity" is a common term in the art which, as used herein, is defined as the ratio of the length of the path followed by a gas flowing through the structure to the length of the shortest possible straight line path through the structure. Thus, it follows that the extruded honeycomb structures have a tortuosity of 1.0. The monolithic structure employed in the process of the present invention preferably has high tortuosity, that is a tortuosity of greater than 1.1. The monolithic structure preferably has a tortuosity in the range of from 1.1 to about 10.0, more preferably in the range of from 1.1 to about 5.0. A most suitable range of tortuosity for the monolithic structure is from 1.3 to 4.0.

The monolithic structure employed in the process of this invention is porous. The monolithic structure is preferably of high porosity. References herein to porous are to a material having pores with a diameter of the order of 0.1 mm. These pores are to distinguished from the micropores which may be present in the carrier material. The monolithic structure preferably contains at least 500 pores per square centimeter, more preferably at least 750 pores per square centimeter. Preferred monolithic structures are those having from 1,000 to 15,000 pores per square centimeter, more preferably from 1,250 to 10,000 pores per square centimeter.

The monolithic structure preferably has a void fraction in the range of from 0.4 to 0.9, more preferably from 0.6 to 0.9.

A most suitable and especially preferred monolithic structure for the catalyst carrier employed in the process of the present invention is a foam. Suitable zirconia foams for use in the process of this invention are available commercially.

The catalyst employed in the process of the present invention may be prepared by processes known in the art. A most suitable process is the impregnation of the zirconia-based material with a compound of the catalytically active metal.

The feed is preferably contacted with the catalyst under adiabatic conditions. For the purposes of this specification, the term "adiabatic" is a reference to reaction conditions under which substantially all heat loss and radiation from the reaction zone is prevented, with the exception of heat leaving in the gaseous effluent stream of the reactor.

In a further aspect, the present invention relates to carbon monoxide or hydrogen whenever prepared by a process as hereinbefore described.

The carbon monoxide and hydrogen produced by the process of this invention may be used in any process employing either one or both of these compounds. The mixture of carbon monoxide and hydrogen prepared by the process is particularly suitable for use in the synthesis of hydrocarbons, for example by means of the Fischer-Tropsch process, or for the synthesis of oxygenates, for example methanol. Processes for the conversion of carbon monoxide and hydrogen into such products are well known in the art. Alternatively, the carbon monoxide and hydrogen product may be used in the manufacture of hydrogen by the water gas shift reaction. Other applications for the products include hydroformylation and carbonylation processes.

The process of the present invention is further described by way of the following illustrative examples, of which Examples 1, 2 and 3 are examples of embodiments of the present invention, and Example 4 is for comparison purposes only.

EXAMPLE 1

A commercially available zirconia foam ($ZrO_2$, 990 pores per square centimeter) was impregnated with rhodium using conventional foam impregnation techniques to give a final rhodium loading of 5% by weight.

The impregnated zirconia foam was loaded into a steel reactor. The catalyst structure had a tortuosity of between 1.5 and 2.5. Natural gas and oxygen were thoroughly mixed and the resulting mixture used as feed and introduced into the reactor to contact the catalyst. The feed had an oxygen-to-carbon ratio of 0.54. The feed was supplied at a gas hourly space velocity (GHSV) of 750,000 Nl/kg/hr (normal liters of gas per kilogram of catalyst per hour) and at a pressure of 1.0 bara.

The operating temperature of the catalyst was measured by optical pyrometry. The composition of the gas leaving the reactor was measured by gas chromatography. The conversion and selectivity of the process to carbon monoxide and hydrogen (on the basis of methane converted) was determined. The operating conditions and the results of the experiment are summarized in the Table hereinbelow.

The feed was preheated to a temperature of 250° C. Initially, however, no reaction was observed. A small region of the catalyst was ignited using heat generated by the combustion of a mixture of propane and oxygen. This resulted in a rapid ignition of the entire catalyst structure, observable as a glow extending rapidly across the catalyst structure from the ignition point in a few seconds. In this time, the entire catalyst was rapidly heated from the initial temperature of 250° C. to the final operating temperature of 1240° C. The catalyst was thus subjected to a thermal shock of greater than 60° C. per second over a temperature range of 990° C. A description of the catalyst at the end of the experiment is given in the Table hereinbelow.

EXAMPLE 2

A commercially available zirconia foam ($ZrO_2$, 990 pores per square centimeter) was impregnated with iridium using conventional impregnation techniques to give a final iridium loading of 5% by weight.

The general experimental procedure described in Example 1 above was followed to test the iridium/zirconia catalyst. The operating conditions and results of the experiment are set out in the Table hereinbelow.

EXAMPLE 3

A commercially available zirconia foam ($ZrO_2$, 990 pores per square centimeter) was impregnated with rhodium using conventional impregnation techniques to give a final rhodium loading of 5% by weight.

The general experimental procedure described in Example 1 above was followed to test the rhodium/zirconia catalyst. The operating conditions and results of the experiment are set out in the Table hereinbelow.

EXAMPLE 4

Comparative Example

By way of comparison, a commercially available alumina foam ($Al_2O_3$) was impregnated with rhodium using conventional impregnation techniques to give a final rhodium loading of 5% by weight.

The general experimental procedure described in Example 1 above was followed to test the rhodium/alumina catalyst. The operating conditions and results of the experiment are set out in the Table hereinbelow.

TABLE

| Example No. | 1 | 2 | 3 | 4 |
|---|---|---|---|---|
| Active Metal | Rhodium | Iridium | Rhodium | Rhodium |
| Carrier | Zirconia foam | Zirconia foam | Zirconia foam | Alumina foam |
| Operating Conditions | | | | |
| Feed Temperature (°C.) | 250 | 250 | 180 | 180 |
| Operating Temperature (°C.) | 1240 | 1265 | 1290 | 1070 |
| Pressure (bara) | 1.0 | 1.0 | 1.0 | 1.0 |
| GHSV (1000 Nl/kg/hr) | 750 | 750 | 750 | 900 |
| oxygen/carbon ratio | 0.54 | 0.55 | 0.55 | 0.55 |
| $CH_4$ conversion (%) | 98.8 | 99.2 | 97.7 | 87 |
| CO selectivity (%)[1] | 94.2 | 94.2 | 95.2 | 93 |
| $H_2$ selectivity (%)[2] | 95.5 | 94.9 | 93.8 | 83 |
| runtime (hours) | 3 | 3 | 2 | 1 |
| Catalyst thermal shock** | >60° C./sec over 990° C. | >60° C./sec over 1015° C. | >60° C./sec over 1110° C. | >60° C./sec over 890° C. |
| Description of catalyst at end of runtime | Undamaged | Undamaged | Undamaged | Shattered into many fragments |

[1]selectivity to CO based on $CH_4$ conversion
[2]selectivity to $H_2$ based on $CH_4$ conversion
*Thermal shock as experienced by catalyst during start up

What is claimed is:

1. A process for the catalytic partial oxidation of a hydrocarbon feedstock, which process comprises contacting a feed comprising a hydrocarbon feedstock and an oxygen-containing gas with a catalyst at a temperature of from 950° C. to 1400° C. such that the catalyst is susceptible to a thermal shock of at least 10° C. per second over a temperature range of at least 100° C., the catalyst having the form of a porous monolithic structure and comprising a catalytically active metal supported on a zirconia-based carrier having at least 70% by weight zirconia.

2. The process according to claim 1 which comprises contacting a preheated pre-ignition gas with said feed and said catalyst prior to, or simultaneously with, contacting of said feed with said catalyst.

3. The process according to claim 1 characterized in that the hydrocarbon feedstock comprises methane, natural gas, or light hydrocarbons.

4. The process according to claim 3, characterized in that the oxygen-containing gas is substantially pure oxygen.

5. The process according to claim 4, characterized in that the feed comprises the hydrocarbon feedstock and the oxygen-containing gas in amounts providing oxygen-to-carbon ratio of from 0.3 to 0.8.

6. The process according to claim 5, characterized in that the feed is contacted with the catalyst at a pressure in the range of from 2 to 125 bara.

7. The process according to claim 5, characterized in that the feed is contacted with the catalyst at a gas hourly space velocity in the range of from 20,000 to 100,000,000 Nl/kg/hr.

8. The process according to claim 1, characterized in that the catalyst comprises, as catalytically active metal, a metal from Group VIII of the Periodic Table of the Elements.

9. The process according to claim 7 wherein said metal is selected from rhodium, iridium, or ruthenium.

10. The process according to claim 1, characterized in that said partially stabilized zirconia comprises oxides of one or more of the Group IIIB or Group IIA elements of the Periodic Table.

11. The process according to claim 1, characterized in that the catalyst is in the form of a monolithic structure having a tortuosity in the range of from 1.1 to 10.0.

12. The process according to claim 1, characterized in that the catalyst is a monolithic structure having a porosity of at least 750 pores per square centimeter.

13. The process according to claim 1, characterized in that the catalyst is in the form of a foam.

14. The process according to claim 13, characterized in that the catalyst has a void fraction in the range of about 0.4 to about 0.9.

* * * * *